March 8, 1938.   K. RABE   2,110,275

METHOD OF MAKING SPLINED SHAFTS

Filed April 10, 1936

Karl Rabe
Inventor
By A. A. Leche
Attorney

Patented Mar. 8, 1938

2,110,275

UNITED STATES PATENT OFFICE 2,110,275

METHOD OF MAKING SPLINED SHAFTS

Karl Rabe, Stuttgart, Germany

Application April 10, 1936, Serial No. 73,646
In Germany December 19, 1934

1 Claim. (Cl. 29—173)

This invention relates to splined shafts and the method for the manufacture thereof, and has particular reference to the manufacture of a spline formation on the end of shafts especially adapted for use as torsion rod springs.

Such rods have usually been made heretofore by turning down on a lathe the intermediate portion of the shaft, leaving enlarged ends upon which the splines were then formed by milling. This manufacturing method has numerous disadvantages among which are the large amount of material wasted, the cost of cutting away excess material, and the insufficient strength of the resulting product. It has been found that in such prior art constructions the strength of the springs is usually determined by the strength of the splined end rather than the strength of the smooth intermediate portion of the shaft, in spite of the fact that the ends are usually of substantially larger diameter. The reason for this has been found to be the low surface density of the tooth profile or spline which results in increased stresses in the marginal fibres. Other sources of weakness are found in the notching where the teeth merge into the neck joining the shaft proper with the enlarged end.

It is an object of the present invention to overcome these disadvantages, more particularly by providing a new method of manufacture which not only eliminates the wasting of material, the high cost of turning and milling, but also results in a stronger product.

More particularly, it is an object of the invention to provide a method of manufacture wherein the enlarged ends are produced by upsetting.

Another object is the method for the formation of the splined construction by rolling.

A further object is to increase the density and hardness of the surface of such splines by a rolling operation.

Another object is to increase the density and hardness of the surface of the intermediate portion of such shafts or rods by rolling.

Other objects will appear from the following description of an illustrative embodiment of the invention taken together with the attached drawing wherein.

In accordance with the invention a round steel rod of original diameter $q$ is upset at one or both of its ends to a diameter $p$. The shaft $a$ including the neck portion $b$ is preferably rolled between two smooth rotating rolls so that the surface of the shaft is compacted to a depth $s$. The ends of the rod $c$ inclusive of the rounded corners $d'$, $e'$, are similarly rolled between toothed rollers whereby teeth $f$ are formed thereupon, the surfaces of which are also compacted to the depth $s$. The ends of the teeth $f$ are at both ends $d'$, $e'$, gradually rounded off. For this purpose the teeth of the rollers run off to a smooth surface. By this method of manufacture the height $h$ of the teeth is of course limited. The temperature at which these rolling operations are carried out depends upon the material used and is so chosen as to produce the desired degree of surface hardness.

Figure 1:
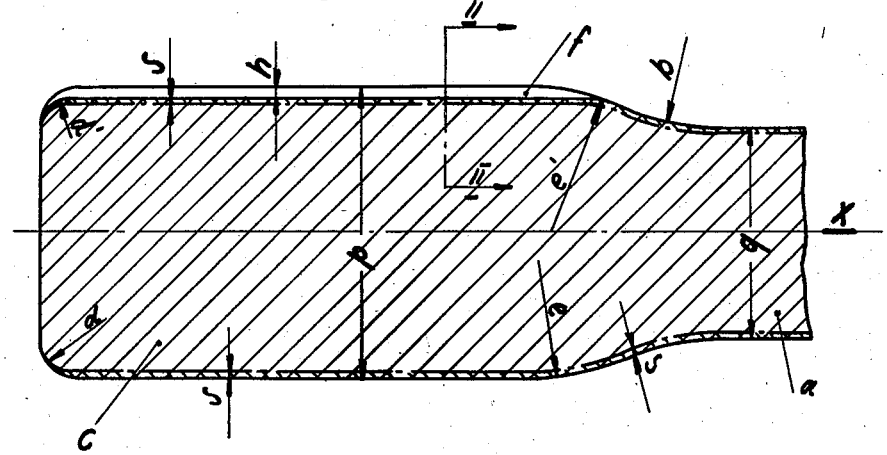
Fig. 1 is a longitudinal cross-section of a shaft or torsion rod made in accordance with the invention.
Figure 2:
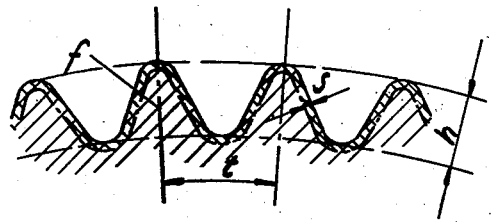
Fig. 2 is a partial cross-sectional view taken on the line II—II of Fig. 1.
Figure 3:
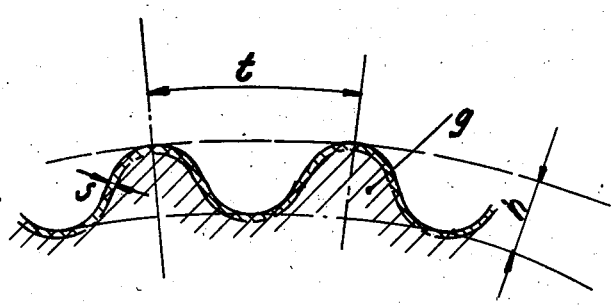
Fig. 3 is a view similar to Fig. 2 but showing teeth of a somewhat different construction.

In order to remove possible inaccuracies resulting from the rolling, the end $c$ of the shaft may subsequently be drawn through a calibrating die. However this may also be avoided if instead of the sharp teeth $f$ (Fig. 2), a rounded tooth profile $g$ (Fig. 3) is utilized since this tooth form facilitates the flow of metal under the rolling pressure.

The number of teeth on account of the greater tooth pitch $t$ may be made smaller. Since no cutting operation is involved and no chips are produced, there is no loss in material. Any properly ductile steel may be used and afterwards appropriately hardened.

Through the working of the material described the rigidity is increased since the fibres which have been compacted being furtherest from the axis are subjected to maximum stress irrespective of whether or not the rod is subjected to torsion or bending. If subjected to pure torsion, the improvement is naturally greater. By means of such rolling operation, all cuts and cracks in the surface of the rod are removed so that a special inspection of the surface of the rod is no longer necessary.

While the invention is applicable to shafts for various purposes, it is especially advantageous in torsion spring rods.

Having described an illustrative embodiment of the invention it is pointed out that various changes and modifications therein may be made without departing from the invention as set forth in the following claim:

What is claimed is:

The process for the formation of spline ended torsion bars comprising the steps of upsetting an end of the torsion bar and thereafter forming splines in said enlarged upset end by rolling and compacting said end between toothed rollers and rolling and compacting the smooth intermediate portion of said torsion bar between smooth rollers.

KARL RABE.